Feb. 7, 1939.  J. N. WHITEHOUSE  2,145,961
BUFFING MACHINE
Filed Sept. 30, 1937   3 Sheets-Sheet 1

INVENTOR:
JOHN N. WHITEHOUSE
BY Julian J. Writte
ATTORNEY

Feb. 7, 1939. J. N. WHITEHOUSE 2,145,961
BUFFING MACHINE
Filed Sept. 30, 1937 3 Sheets-Sheet 2
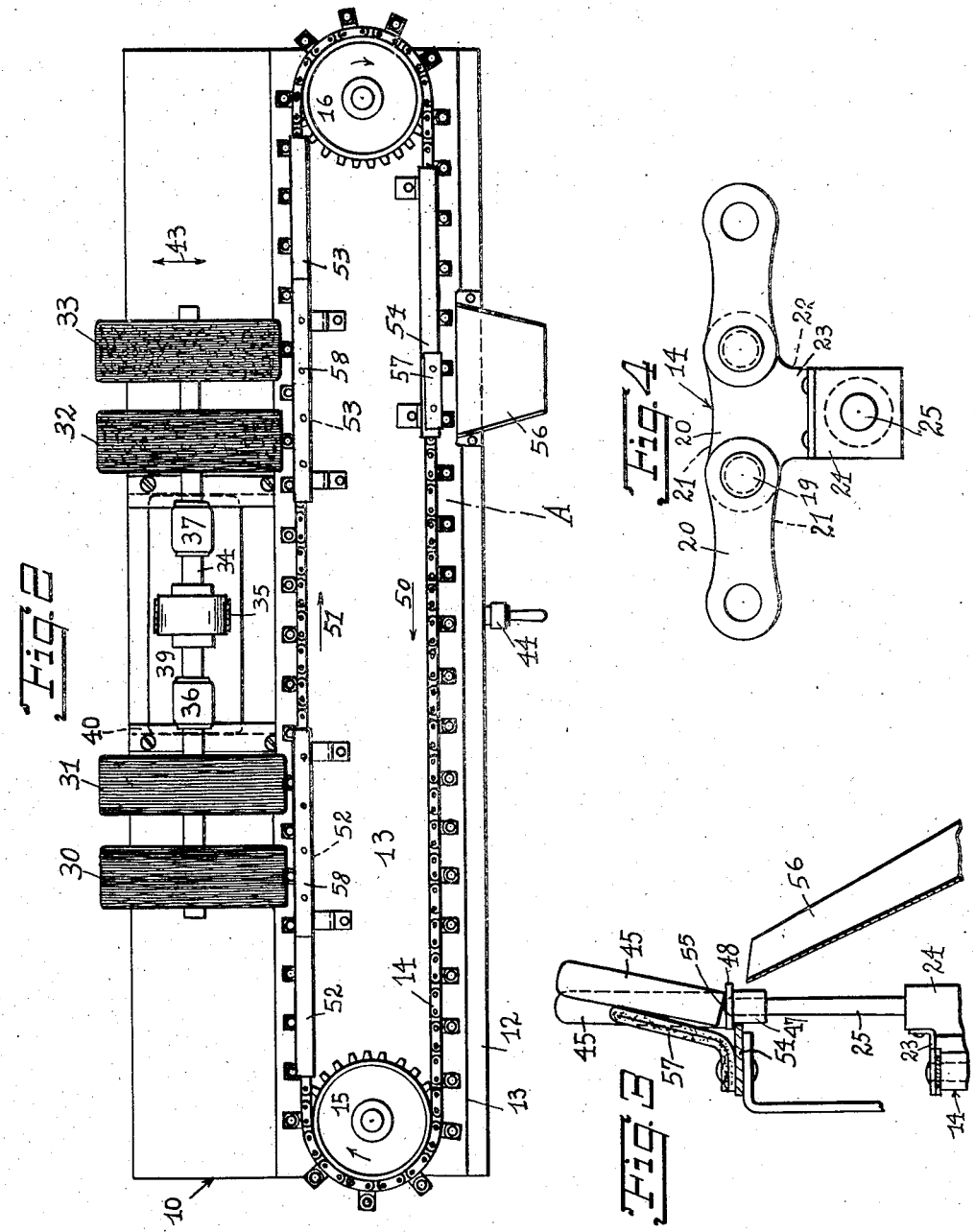
INVENTOR:
JOHN N. WHITEHOUSE,
BY Julian J. Wittel
ATTORNEY Feb. 7, 1939. J. N. WHITEHOUSE 2,145,961
BUFFING MACHINE
Filed Sept. 30, 1937 3 Sheets—Sheet 3
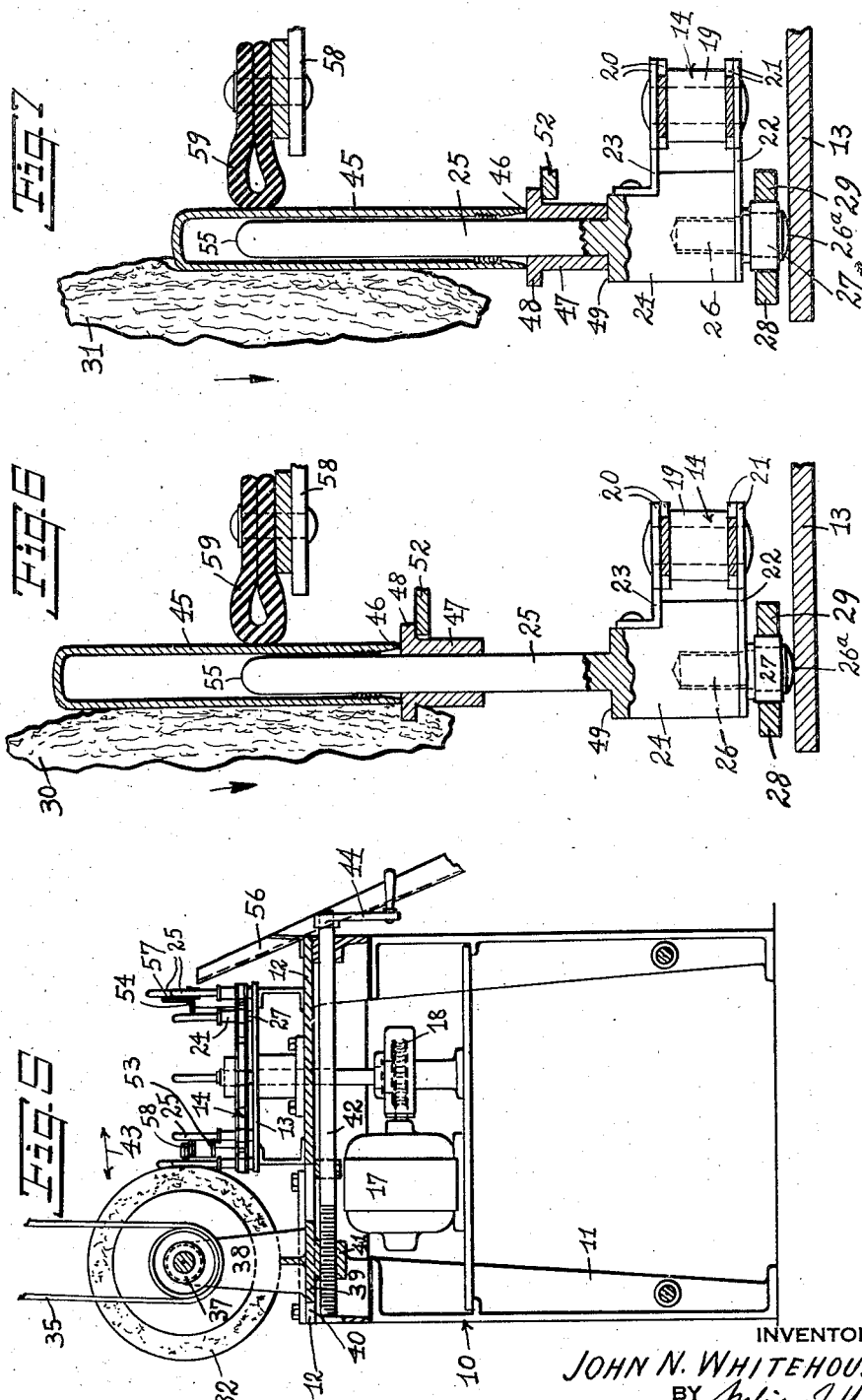
INVENTOR:
JOHN N. WHITEHOUSE,
BY Julian J. Wittal
ATTORNEY.

Patented Feb. 7, 1939

2,145,961

UNITED STATES PATENT OFFICE 2,145,961

BUFFING MACHINE

John N. Whitehouse, New York, N. Y.

Application September 30, 1937, Serial No. 166,481

11 Claims. (Cl. 51—76)

This invention relates to buffing, polishing and similar machines, and has for its main object to provide a device of this type which is more efficient and particularly more adapted for buffing and polishing tubular objects, like barrels and caps for fountain pens, than the machines and devices at present used for such purposes.

Another object of my invention is to provide a buffing device wherein the several portions or regions of the object to be buffed may be presented to the buffing heads successively in order to avoid undue heating and to provide more uniform and higher quality buffing and polishing.

Still a further object of my invention is to present regions of an object to be buffed to the buffing heads in succession in an automatic manner and also to provide means to automatically eject or remove the ready objects, the buffed tubes, from the machine.

Still another object of my invention is to present the object to be buffed to successively buffing heads arranged in a straight line, thereby eliminating the complications and waste accompanying the circular arrangement of successive buffing heads now in use for such purposes.

Still a further object of my invention is to provide an endless moving element in a machine of the type indicated, carrying the objects to be buffed or polished through the previously mentioned processes and steps in one continuous operation.

Still further objects of my invention will be apparent as the specification of the same proceeds, and among others I may mention:—

To provide adjustable buffing heads for regulating the pressure, friction and heat on the objects to be buffed; to provide easy and efficient feeding and removing of the objects; to provide in such a machine several buffing heads in succession operating in various manners for various predetermined purposes on various regions of the objects to be buffed; to provide a machine of the above described type which will be comparatively simple, inexpensive to manufacture and reliable in operation.

With such objects in view, my invention mainly consists in providing several usual rotating buffing heads in a straight line, providing a moving element carrying the objects to be buffed in front of said row of buffing heads, and raising and lowering the objects while so moving in an appropriate manner as they reach the various buffing heads. Automatic means may be provided to eject the objects after the last operation and to feed them before the first one, and such moving element preferably may consist of an endless chain, and for more efficient operation and for better use of the space one branch of the chain may pass before the buffing heads, the return branch thereof being used to feed the new objects and to eject the finished ones.

In the drawings, forming a part of this specification and accompanying the same:

Fig. 2 is a similar plan view thereof;

Fig. 3 is a fragmentary sectional detail showing the means for ejecting the ready articles, the section being taken on the line 3—3 of Fig. 1;

Fig. 4 shows an element of my carrying chain in plan view, showing the blocks with pins for the tubular articles formed on selected links thereof;

Fig. 5 is a sectional elevation of my assembled machine, the section being taken on the line 5—5 of Fig. 1;

Figure 1:
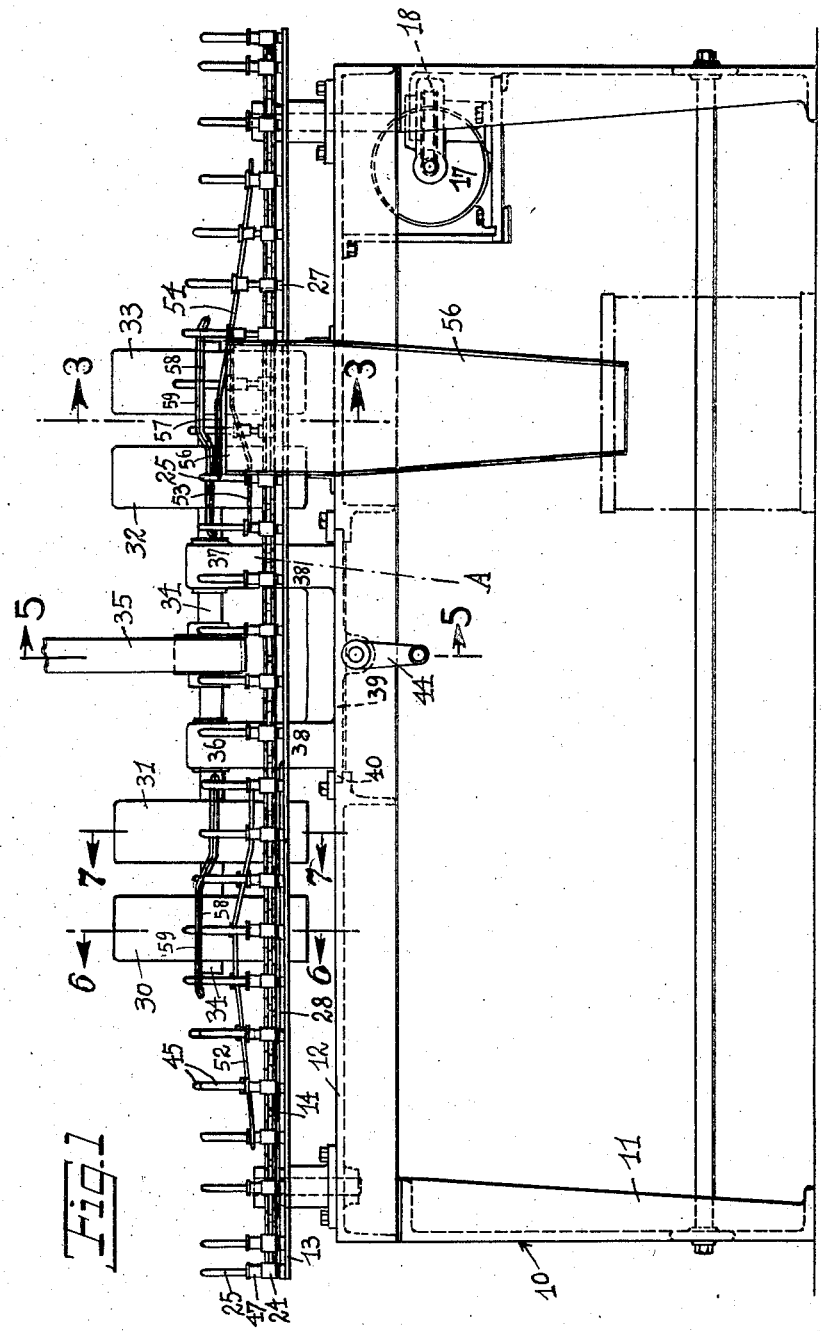
Fig. 1 is a semi-diagrammatical front elevation of the preferred embodiment of my assembled machine.

Figs. 6 and 7 are fragmentary sectional details on an enlarged scale, showing the raising and lowering of the tubes to be buffed, the sections being taken on the lines 6—6 and 7—7, respectively, of Fig. 1.

Referring now to the drawings more in detail, by characters of reference, the numeral 10 indicates the frame of my machine, of any appropriate usual construction, here being shown with the legs 11 and the top 12.

On the front part of the top is arranged a raised platform 13 on which is a movable endless chain 14, having sprocket wheels 15 and 16, wheel 16 being adapted to be driven from an electrical motor 17 by the endless screw drive 18, as indicated on the drawings, or by any other appropriate means well-known in the art.

The endless chain 14 is formed of rollers 19, with upper and lower link members 20 and 21, respectively, connecting them, as it is well-known to those versed in this art. At suitable distances, the lower links 21 are extended, as indicated at 22 in Figs. 4 and 6, while the upper links 20 in the same element of the chain have angle extensions 23.

Blocks of metal 24 are secured to the extensions 22 and 23, as indicated in Fig. 6, said blocks 25 being upwardly continued in circular pins 25.

The securing of each lower link extension 22 is provided for by a screw 26 which may have a roller 27 at its lower end, projecting downwardly from the block 24, and appropriate guides 28 and 29 may be provided for the chain, between which the rollers 27 may ride, said guides 28 and 29 being secured at the desired places on the platform 13. Such guides are particularly used in front of the buffing heads 30, 31, 32 and 33 to prevent a yielding of the chain under the pressure of the said buffing heads, as will be more fully explained hereinafter. The rounded ends 26a of the screws 26 may rest and ride on the platform 13 to support the chain and the elements carried therewith.

The buffing heads 30, 31, 32 and 33 are arranged in the rear of the machine on a common shaft 34, being driven by a belt 35, from an appropriate source of power (not shown) and said shaft is journalled in bearings 36 and 37, being carried by an upright 38 and base plate 39 (Figs. 2 and 5), said plate 39 being slidable in a transverse direction to the machine, as in guides 40, and having a downward extension 41, in which is operating a screw 42. It will be seen that upon the rotation of the screw 42 in a right-handed or a left-handed direction said plate 39 and the mechanisms associated therewith, including the buffing heads 30, 31, 32 and 33, will be moved in a forward or rearward direction, as indicated by the double arrow 42, thereby moving the buffing heads forwardly, nearer the objects to be operated on, or rearwardly, away from them. A crank or handle 44 may be provided for the operation of the screw 42, as will be understood.

My machine is particularly designed for the buffing of fountain pen caps and barrels, usually made of Celluloid or similar plastic materials, the barrels or caps operated on, being indicated in the figures by the numerals 45.

As best seen in Figs. 6 and 7, the barrels 45 will be slipped over the pins 25 of the endless chain 14, the lower ends 46 of said barrels or tubes resting on an upwardly and downwardly slidable sleeve 47, having upper flanges 48, said sleeves 47 normally resting on the top surfaces 49 of the respective traveling blocks 24.

In the embodiment shown, the chain will travel in the direction of the arrow 50 in its forward branch, and the feeding of the machine, that is, the slipping of the row of barrels 45 on the pins 25, may be best done at about the place marked with the letter A.

The barrels 45, slipped on the pins 25, will first travel in a left-handed direction (Figs. 1 and 2), the sleeves 47 resting on the blocks 24 and the barrels being in their normally lowermost positions (Fig. 7); they then will circle around the sprocket wheel 15, and will start riding in a reverse right-handed direction in the operative, rear branch of the chain, as indicated by the arrow 51.

Secured on the left-hand rear portion of the platform 13 is arranged a first raising and lowering guide or rail 52, reaching underneath the inner ends of the flanges 18 of sleeves 47 and thereby causing said sleeves to ride upwardly and then downwardly on said rail 52, as indicated in Figs. 1, 2, 6 and 7.

It will be seen that the sleeves 47, and the barrels 45 thereon, will first be raised to a higher position and will pass in front of the buffing wheel 30 in such a position, thereby causing said wheel to operate on the lower half of the barrels 45 (Fig. 6). After passing the wheel 30, guide 52 will lower the sleeves 47 (Fig. 7) and with it the barrels 45, and the second buffing wheel 31 will now operate upon the upper portions of the tubes or barrels 45. After having left the guide 52, the sleeves 47 will ride along the rear or operative branch of the chain 14 in their lowermost position until they arrive at a second guide 53 in front of the buffing wheels 32 and 33, said guide 53 will again raise and lower the sleeves 47, dividing the operations of the wheels 32 and 33 on the upper and lower portions of the tubes 45.

The sleeves 47 upon leaving the second guide 53 will again drop to their normal positions, as shown in Fig. 7, and ride around the second sprocket wheel 16, arriving to a third raising or lifting guide 54 on the right-hand side of the front of my machine. Guide 54 will raise sleeves 47 to such a height that their upper flanges 48 will be at the level of the tops 55 of the respective pins 25, or even above the same, so that the finished barrels 45 may easily tilt or drop outwardly into a receiving chute 56, as will be understood, (Fig. 3). To aid in the outward ejection of the barrels 45, a resiliently yielding member 57, like a piece of leather, may be secured along the highermost portion of the guide 54.

Upon leaving the ejecting guide 54, the sleeves 47 will again drop back into their lowermost normal positions and start to ride around with the endless chain, the new barrels or tubes 45 being slipped over their pins 25 at the place indicated by A.

I prefer to move the buffing heads 31 to 33 forwardly to such an extent that the barrels 45 will be partly pressed into the peripheral portions of the soft material of said buffing heads, as indicated in Figs. 6 and 7, for better results, while, of course, the closing of the buffing heads upon the barrels 45 will be done in such a manner that no undue heating or burning of said barrels may result.

In order that resistance should be provided for the barrels, while being operated on by the buffing heads 30 to 33, auxiliary rails 58 may be provided, in any appropriate manner, over and along the operative portions of the guides 52 and 53, a somewhat yielding and resilient element 59, like a folded sheet of rubber, being secured along and on each of said upper rails 58, said members 59 resiliently pressing the tubes 45 against the wheels 30 to 33, and, through their frictional actions also causing said tubes or barrels 45 to rotate on their pins 25; such pressing and rotation of said barrels being desirable for better results and also to allow the cooling of the barrels 45 during the operations.

It is to be observed that the buffing heads 30, 31, 32 and 33, respectively, may be of different characters as, for instance, the first pair being treated with pumice for the so-called "cutting" operation, and the second pair being treated with tripoli for the buffing proper.

With the present machines used for buffing operations, the successive buffing heads are arranged in a circle and it is obvious that great waste and inefficiency is the result of this arrangement since the units of buffing heads must be driven separately or a very complicating mechanism will have to be provided for a central drive for them, while the circular travel of the articles to be operated on will cause the operative outer surfaces of the respective buffing heads to engage said articles practically on one point only when the new buffing heads are starting, and the circularly moving articles will have to wear circular surfaces in the outward portions of the buffing heads before the whole widths of said heads will be used in the operations. With my machine, the articles will ride along the operating width of every buffing head right from the start.

While I have illustrated and described a preferred embodiment of my invention, it is to be understood that changes and variations may be made in the details of construction and combinations thereof, and I reserve my rights to such changes, modifications and variations which are within the spirit of this specification and the scope of the claims hereunto appended.

What I claim as new, is:

1. In a machine for buffing, polishing and like operations on tubular objects, a plurality of rotating buffing heads, a moving member, a plurality of upstanding pins on said moving member, the tubes to be operated on being placed over said pins in slidable and rotatable relation thereto, said tubes being adapted to pass in front of and in engagement with said buffing heads, and means to raise and lower said tubular objects, on said pins, as they engage successive buffing heads to expose various portions of said tubes to various buffing heads.

2. In a machine for buffing, polishing and like operations on tubular objects, a plurality of rotating buffing heads, a moving member, a plurality of upstanding pins on said moving member, the tubes to be operated on being placed over said pins in slidable and rotatable relation thereto, said tubes being adapted to pass in front of and in engagement with said buffing heads, and means to raise and lower said tubular objects on said pins, as they engage successive buffing heads, to expose various portions of said tubes to various buffing heads, said means to raise and lower said tubes including slidable sleeves on said pins on which said tubes may rest, projecting elements on said sleeves, rising and descending guides in front of said buffing heads, said projecting elements being adapted to engage and slide on said guides and so cause said sleeves with the tubes thereon to be raised and lowered.

3. In a machine for buffing or like operations, as set forth in claim 1, means to raise said objects above the upper ends of the respective pins so as to permit them to be removed from the machine.

4. In a machine for buffing or like operations, as set forth in claim 1, means to raise said objects above the upper ends of the respective pins so as to permit them to be removed from the machine, and means to cause said objects to drop from the machine by meeting a resistance when raised above said pins.

5. In a machine for buffing or like operations, as set forth in claim 1, means to raise said objects above the upper ends of the respective pins so as to permit them to be removed from the machine, and means to cause said objects to drop from the machine by meeting a resistance when raised above said pins, said resistance being a resilient yielding member.

6. In a machine for buffing or like operations, as set forth in claim 2, means to raise said sleeves into positions where their upper ends are above the tops of the respective pins so as to permit said objects to be freed and removed from the machine.

7. In a machine for buffing or like operations, as set forth in claim 2, means to raise said sleeves into positions where their upper ends are above the tops of the respective pins so as to permit said objects to be freed and removed from the machine, and means to cause said objects to drop from the tops of the respective sleeves.

8. In a machine for buffing, polishing or like operations, as set forth in claim 1, guide rails to effect said raising or lowering of said objects, and rails in parallelism with said guide rails spaced apart therefrom, carrying resilient members adapted to engage said objects while being operated on and to cause them to rotate.

9. In a machine for buffing, polishing and like operations on tubular objects, a plurality of rotating buffing heads, a moving member, a plurality of upstanding pins on said moving member, the tubes to be operated on being placed over said pins in slidable and rotatable relation thereto, said tubes being adapted to pass in front of and in engagement with said buffing heads, said moving members being in the form of an endless chain carrying said pins, said pins being secured on spaced apart blocks projecting from said chain to carry said pins, projections on the lower ends of the blocks and a supporting surface for said chain on which said projections may slide.

10. In a machine for buffing, polishing and like operations on tubular objects, a plurality of rotating buffing heads, a moving member, a plurality of upstanding pins on said moving member, the tubes to be operated on being placed over said pins in slidable and rotatable relation thereto, said tubes being adapted to pass in front of and in engagement with said buffing heads, said moving member being in the form of an endless chain carrying said pins, said pins being secured on spaced apart blocks projecting from said chain to carry said pins, downward extensions on said blocks, a supporting surface on which said downward extensions may slide, guide rails for said chain, said guide rails engaging said downward extensions.

11. In a machine for buffing, polishing and like operations on tubular objects, a plurality of rotating buffing heads, a moving member, a plurality of upstanding pins on said moving member, the tubes to be operated on being placed over said pins in slidable and rotatable relation thereto, said tubes being adapted to pass in front of and in engagement with said buffing heads, said moving member being in the form of an endless chain carrying said pins, pairs of upper and lower links in said chain, extensions on the upper and lower links in selected pairs, a block secured to the upper extension in each selected pair of links, said block carrying the respective pin, an extension on the lower link in each selected pair underlying the respective block, a downward pin secured into said block, securing the same to said lower extension, said pin having a rounded lower surface, a supporting surface for said chain on which the rounded lower end of said downward pins may slide, rollers on said downward pins and guide rails for said pins engaging said rollers.

JOHN N. WHITEHOUSE.